(12) United States Patent
Takeda et al.

(10) Patent No.: US 11,772,125 B2
(45) Date of Patent: Oct. 3, 2023

(54) ANTIGLARE FILM-COATED SUBSTRATE, ANTIGLARE FILM FORMING LIQUID COMPOSITION, AND METHOD OF PRODUCING ANTIGLARE FILM-COATED SUBSTRATE

(71) Applicant: AGC Inc., Chiyoda-ku (JP)

(72) Inventors: Yosuke Takeda, Chiyoda-ku (JP); Takamichi Shimosaka, Chiyoda-ku (JP); Toru Ikeda, Chiyoda-ku (JP); Osamu Homma, Chiyoda-ku (JP); Daisuke Kobayashi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 278 days.

(21) Appl. No.: 15/723,801

(22) Filed: Oct. 3, 2017

(65) Prior Publication Data

US 2018/0099307 A1    Apr. 12, 2018

(30) Foreign Application Priority Data

Oct. 7, 2016  (JP) ................................ 2016-198922
Aug. 23, 2017  (JP) ................................ 2017-160279

(51) Int. Cl.
*G02B 1/11*    (2015.01)
*G02B 1/14*    (2015.01)
(Continued)

(52) U.S. Cl.
CPC .................. *B05D 1/04* (2013.01); *G02B 1/11* (2013.01); *G02B 1/115* (2013.01); *G02B 5/0221* (2013.01);
(Continued)

(58) Field of Classification Search
CPC .......... G02B 1/11; G02B 1/14; G02B 5/0294; G02B 5/0221
See application file for complete search history.

(56) References Cited

U.S. PATENT DOCUMENTS

| 4,904,525 | A | 2/1990 | Taniguchi et al. |
| 4,940,602 | A | 7/1990 | Taniguchi et al. |

(Continued)

FOREIGN PATENT DOCUMENTS

| CN | 1175078 | 3/1998 |
| CN | 101680973 | 3/2010 |

(Continued)

*Primary Examiner* — Laura A Auer
(74) *Attorney, Agent, or Firm* — Oblon, McClelland, Maier & Neustadt, L.L.P.

(57) ABSTRACT

To provide an antiglare film-coated substrate that has an excellent antiglare property and reduced haze and through which cloudiness is not easily recognized visually on a black printed layer when the black printed layer is seen therethrough, for example, an antiglare film forming liquid composition for forming the antiglare film, and a method of producing an antiglare film-coated substrate. An antiglare film-coated substrate 1 includes a transparent substrate 2; and an antiglare film 3 provided on the transparent substrate 2, in which the antiglare film 3 contains silica as its main component and a $CF_3(CH_2)_n$-group where n is an integer of 1 to 6, and the antiglare film 3 has surface roughness curve skewness Rsk of 1.3 or less and has arithmetic mean roughness Ra of 0.01 μm or more.

15 Claims, 2 Drawing Sheets

(51) Int. Cl.
   *B05D 1/04*   (2006.01)
   *G02B 5/02*   (2006.01)
   *G02B 1/115*  (2015.01)

(52) U.S. Cl.
   CPC .............. *G02B 5/0294* (2013.01); *G02B 1/14* (2015.01); *G02B 2207/109* (2013.01)

(56) References Cited

U.S. PATENT DOCUMENTS

| | | | | |
|---|---|---|---|---|
| 2001/0050741 | A1* | 12/2001 | Hokazono | G02B 1/11 |
| | | | | 349/137 |
| 2007/0285776 | A1* | 12/2007 | Nakamura | G02B 1/105 |
| | | | | 359/487.02 |
| 2008/0247045 | A1 | 10/2008 | Suzuki et al. | |
| 2010/0238384 | A1 | 9/2010 | Tochigi et al. | |
| 2013/0038834 | A1* | 2/2013 | Cado | G02C 7/104 |
| | | | | 351/159.62 |
| 2014/0148547 | A1* | 5/2014 | Ishida | C09D 201/00 |
| | | | | 524/544 |
| 2014/0374377 | A1* | 12/2014 | Schulz | B29C 59/14 |
| | | | | 216/24 |
| 2015/0037566 | A1* | 2/2015 | Ekinaka | B05D 3/0473 |
| | | | | 428/329 |
| 2017/0021383 | A1 | 1/2017 | Takai et al. | |
| 2018/0251398 | A1* | 9/2018 | Ikegami | C03C 17/25 |

FOREIGN PATENT DOCUMENTS

| | | | |
|---|---|---|---|
| CN | 102911539 | 2/2018 | |
| JP | 64-1527 | 1/1989 | |
| JP | 2002-79616 | 3/2002 | |
| JP | 2003-344608 | 12/2003 | |
| JP | 2009-115882 A | 5/2009 | |
| JP | 2009-288732 A | 12/2009 | |
| JP | 2010-244016 A | 10/2010 | |
| JP | 2012-163652 A | 8/2012 | |
| JP | 2016-41481 A | 3/2016 | |
| JP | 2016-114919 A | 6/2016 | |
| JP | 2016-136232 | 7/2016 | |
| WO | WO 2005/121265 A1 | 12/2005 | |
| WO | WO 2012/124323 | 9/2012 | |
| WO | WO 2015/186669 A1 | 12/2015 | |
| WO | WO 2016/021560 A1 | 2/2016 | |
| WO | WO-2017043538 A1 * | 3/2017 | ............. C03C 17/25 |

* cited by examiner

ANTIGLARE FILM-COATED SUBSTRATE, ANTIGLARE FILM FORMING LIQUID COMPOSITION, AND METHOD OF PRODUCING ANTIGLARE FILM-COATED SUBSTRATE

CROSS REFERENCE TO RELATED APPLICATIONS

This application is based upon and claims the benefit of priority from Japanese Patent Application No. 2016-198922 filed on Oct. 7, 2016, and Japanese Patent Application No. 2017-160279 filed on Aug. 23, 2017; the entire contents of which are incorporated herein by reference.

FIELD

The present invention relates to an antiglare film-coated substrate, an antiglare film forming liquid composition, and a method of producing an antiglare film-coated substrate.

BACKGROUND

In image display devices (such as, for example, a liquid crystal display, an organic EL display, and a plasma display) provided on various devices (such as, for example, televisions, personal computers, smart phones, mobile phones, and vehicles), when external light such as room lighting of fluorescent light or the like or solar light is reflected on a display surface, visibility decreases by a reflected image.

As a method of suppressing the reflection of external light, there is a method of arranging an antiglare film on a display surface side of an image display device. The antiglare film has surface irregularities to diffusely reflect external light, to thereby blur the reflected image. Such an antiglare film is formed by applying a coating solution containing, as a silica precursor, for example, a hydrolyzable organosilicon compound such as an alkoxysilane hydrolyzed condensate on a surface of a substrate by a spray method, followed by burning (see Patent Reference WO 2016/021560 A1, for example).

Further, there is also a method in which a low-reflection film is arranged on a display surface of an image display device to suppress reflection itself of light incident on a transparent substrate, to thereby blur a reflected image. As the low-reflection film, a single layer film made of a low-refractive index material and a multilayer film composed of a layer made of a low-refractive index material and a layer made of a high-refractive index material are known. Further, as the low-reflection film, a film formed of a fluorine-containing hydrolyzable organosilicon compound is also known (see Patent References JP-A Sho 64-1527, JP-A 2003-344608, JP-A 2002-79616 and WO 2005/121265 A1, for example).

SUMMARY

An antiglare film is arranged on a display surface of an image display device, thereby making it possible to suppress a decrease in visibility of an image caused by reflection of external light on the display surface. At the same time, however, as the antiglare film has a higher antiglare property, the haze is likely to be higher.

In the image display device, on the visible side of a front plate, the antiglare film is formed, and at a peripheral portion of a surface on the non-visible side having the antiglare film not provided thereon, a light shielding part such as a black printed layer is provided for the purpose of improving its design or beautiful appearance. At this time, when the haze of the antiglare film is high, cloudiness is sometimes visually recognized when the black printed layer is seen through the antiglare film, thereby causing a problem of impairing the beautiful appearance.

An object of the present invention is to provide an antiglare film-coated substrate having an excellent antiglare property and having reduced haze, an antiglare film forming liquid composition for forming the antiglare film, and a method of producing an antiglare film-coated substrate.

The present invention has the following aspects.

(1) An antiglare film-coated substrate, comprising: a transparent substrate; and an antiglare film provided on the transparent substrate, wherein the antiglare film contains silica as its main component and a $CF_3(CH_2)_n$-group where n is an integer of 1 to 6 and wherein the antiglare film has surface roughness curve skewness Rsk of 1.3 or less and has arithmetic mean roughness Ra of 0.01 µm or more.

(2) An antiglare film forming liquid composition comprising, trifluoropropyltrimethoxysilane, scaly silica particles, and a liquid medium.

(3) A method of producing an antiglare film-coated substrate, comprising: applying an antiglare film forming liquid composition containing trifluoropropyltrimethoxysilane, scaly silica particles and liquid medium on a transparent substrate by a spray coating method to form an applied film, and burning the applied film to obtain an antiglare film-coated substrate, wherein the antiglare film contains silica as its main component and a $CF_3(CH_2)_n$-group where n is an integer of 1 to 6, and wherein the antiglare film has surface roughness curve skewness Rsk of 1.3 or less and has arithmetic mean roughness Ra of 0.01 µm or more.

Incidentally, the following definitions of terms will be applied throughout this description including the claims.

A "silica precursor" means a substance capable of forming a matrix containing, as its main component, silica as a component relating to network connection.

"Containing, as its main component, silica" means containing 50 mass % or more of $SiO_2$.

A "hydrolyzable group bonded to a silicon atom" means a group capable of being converted into an OH group bonded to a silicon atom by hydrolysis.

"Scaly particles" mean particles having a flat shape. The shape of the particles can be confirmed by means of a transmission electron microscope (to be also referred to as TEM, hereinafter).

An "average particle size" of the scaly particles means a particle diameter at the point of 50% in a cumulative volume distribution curve with the total volume of the particle size (maximum length) distribution obtained by volume set to 100%, namely a volume-based cumulative 50% diameter (D50). The particle size distribution is obtained by the frequency distribution and the cumulative volume distribution curve measured by a laser diffraction/scattering type particle size distribution measuring apparatus.

An "aspect ratio" means a ratio of a particle diameter to a particle thickness (maximum length/thickness), and an "average aspect ratio" is an average value of the aspect ratios of 50 particles selected randomly. The thickness of a particle is measured by an atomic force microscope (to be also referred to as AFM, hereinafter), and the maximum length is measured by the TEM.

According to the present invention, it is possible to obtain an antiglare film-coated substrate having an excellent antiglare property and reduced haze.

According to the present invention, it is possible to provide an antiglare film forming liquid composition and a method of producing an antiglare film-coated substrate for obtaining an antiglare film-coated substrate having an excellent antiglare property and reduced haze.

DETAILED DESCRIPTION

Hereinafter, there will be explained embodiments in detail with reference to the drawings.

First Embodiment

Figure 1:
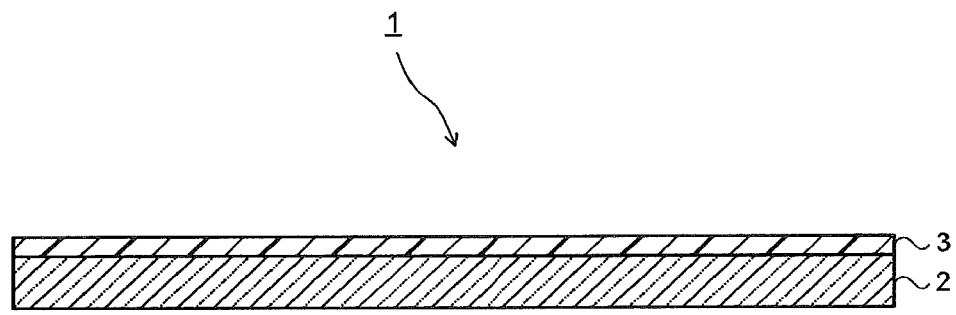
FIG. 1 is a schematic cross-sectional view illustrating an antiglare film-coated substrate according to a first embodiment.

FIG. 1 is a schematic cross-sectional view illustrating an antiglare film-coated substrate according to an embodiment of the present invention. An antiglare film-coated substrate 1 illustrated in FIG. 1 includes a transparent substrate 2, and an antiglare film 3 provided on the transparent substrate 2.

In the antiglare film-coated substrate 1, the antiglare film 3 contains, as its main component, silica and contains a $CF_3(CH_2)_n$-group (where n is an integer of 1 to 6, and the same is also applied below). Further, the antiglare film 3 has surface roughness curve skewness Rsk of 1.3 or less and has arithmetic mean roughness Ra of 0.01 μm or more. The antiglare film 3 has the above-described characteristics, to thereby make the antiglare film-coated substrate 1 have an excellent antiglare property and reduced haze, and thereby visual recognition of cloudiness is suppressed when seeing a black printed layer through the antiglare film-coated substrate 1, for example. Hereinafter, there will be explained respective components of the antiglare film-coated substrate 1.

(Transparent Substrate 2)

The transparent substrate 2 is not limited in particular as long as it is made of a transparent material for which addition of an antiglare property by an antiglare film is desired, and for example, substrates composed of glass, resin, and combinations of these (composite material, layered material, and so on) are preferably used. As the glass, for example, soda lime glass, borosilicate glass, aluminosilicate glass, non-alkali glass, and so on can be cited. As the resin, for example, polyethylene terephthalate, polycarbonate, triacetylcellulose, polymethyl methacrylate, and so on can be cited.

Further, the form of the transparent substrate 2 is also not limited in particular, and for example, a plate shape having rigidity, a film shape having flexibility, or the like can be applied.

The surface of the transparent substrate 2, where the antiglare film 3 is to be formed, (to be also referred to as a "main surface" hereinafter) may be smooth, or may have concavities and convexities. In view of usability of providing the antiglare film 3 (in view of obtaining desired optical characteristics), the surface is preferred to be smooth. Incidentally, the antiglare film 3 to be provided on the transparent substrate 2 does not have to be formed on the entire main surface of the transparent substrate 2. That is, the antiglare film 3 only needs to be formed in a predetermined region to which the antiglare property is added on the main surface of the transparent substrate 2, and does not have to be formed in an other region.

The shape of the transparent substrate 2 is not limited to such a flat shape as illustrated in the drawing, and may be a shape having a curved surface. In this case, its whole body may be formed of a curved surface, or may be formed of a curved surface portion and a flat portion. Recently, in various devices (such as televisions, personal computers, smart phones, and car navigation systems) provided with an image display device, an image display device having a curved display surface appears. The antiglare film-coated substrate 1 including the transparent substrate 2 having a curved surface shape is useful for being applied to such an image display device.

As the transparent substrate 2, a glass substrate is preferred. A method of producing the glass substrate is not limited in particular. The glass substrate can be produced in a manner that a desired glass raw material is put into a melting furnace, and heated and melted, followed by firing, and then the resultant is supplied into a molding apparatus to mold a molten glass, followed by gradual cooling. Incidentally, a method of molding the glass substrate is not limited in particular, and glass substrates molded by, for example, a float method, a fusion method, a down-draw method, and so on can be used.

The thickness of the transparent substrate 2 can be appropriately selected according to its use, and when the glass substrate is used as the transparent substrate 2, the thickness is preferably 0.1 to 5 mm and more preferably 0.2 to 2.5 mm.

When the glass substrate is used as the transparent substrate 2, a glass substrate whose main surface is tempered is preferred. The tempering improves the strength of glass, resulting in that it is possible to reduce the thickness while maintaining the strength, for example. The antiglare film may be formed on an untempered glass substrate, to then be tempered.

As the tempering process, a process of forming a compressive stress layer on a glass plate surface by an air-cooling tempering method (physical tempering method) or a chemical tempering method can be cited. The compressive stress layer on the glass substrate surface improves the strength of the glass substrate against a flaw or shock. Between them, the chemical tempering method is preferred because it is possible to strengthen the glass substrate sufficiently even though the thickness of the glass substrate becomes thin (for example, less than 2 mm).

In the chemical tempering method, a glass plate is immersed in molten salt at a temperature equal to or less than a glass strain point temperature to exchange ions of a surface layer of the glass plate (for example, sodium ions) for ions having a larger ion radius (for example, potassium ions). Thereby, a compressive stress is generated in the surface layer of the glass plate.

The chemically tempered glass substrate has a surface compressive stress (CS) of 450 MPa to 1200 MPa and has a stress layer depth (DOL) of 10 μm to 50 μm, for example.

The antiglare film-coated substrate 1 may include functional layers such as an undercoat layer, an adhesion-improved layer, and a protective layer between the transparent substrate 2 and the antiglare film 3. The undercoat layer has functions as an alkali barrier film and a wide-band low-refractive index layer. As the undercoat layer, a layer formed by applying a forming composition for undercoating containing a hydrolysate of alkoxysilane (sol-gel silica) on the transparent substrate 2 is preferred.

(Antiglare Film)

The antiglare film 3 has a concave and convex structure on its surface to irregularly reflect external light irradiating the transparent substrate 2, to thereby suppress surface reflection of the external light. In various image display devices such a liquid crystal display (LCD) and a plasma display (PDP), for example, when external light such as room lighting (such as fluorescent light) or solar light is reflected on a display surface, visibility decreases by a reflected image. In contrast to this, the antiglare film 3 is provided on the transparent substrate 2 to irregularly reflect the external light, thereby making it possible to suppress the decrease in visibility by the reflected image.

The antiglare film 3 contains, as its main component, silica and contains the $CF_3(CH_2)_n$-group. Further, the antiglare film 3 has the surface roughness curve skewness Rsk of 1.3 or less and has the arithmetic mean roughness Ra of 0.01 μm or more.

The antiglare film 3 is formed by using an antiglare film forming liquid composition containing a silica precursor (fluorine-containing silica precursor) containing a $CF_3(CH_2)_n$-group (A), scaly particles (B), and a liquid medium (C), for example. In this case, the fluorine-containing silica precursor (A) forms a matrix containing, as its main component, silica and containing a $CF_3(CH_2)_n$-group. Then, the scaly particles (B) are dispersed in this matrix, and then the antiglare film 3 is formed. A method of forming the antiglare film 3 using such an antiglare film forming liquid composition will be explained in detail later.

The $CF_3(CH_2)_n$-group contained in the antiglare film 3 has a fluorine atom, and thus is not easily combusted at the time of heating. Therefore, it is possible to suppress porosification of the antiglare film 3 obtained by burning this antiglare film forming liquid composition. Further, the antiglare film 3 contains the $CF_3(CH_2)_n$-group having a fluorine atom thereinside, thereby exhibiting excellent chemical resistance and moisture resistance.

The $CF_3(CH_2)_n$-group in the antiglare film 3 can be identified in a manner that the antiglare film 3 is scraped off from the transparent substrate 2 and a powder sample is made using the scraped antiglare film 3 to be subjected to analysis by a nuclear magnetic resonance spectroscopy (NMR), an infrared spectroscopy (IR), or the like. When a later-described anti-fouling film is formed on the surface of the antiglare film 3, the above-described analysis can be performed after removing the anti-fouling film. The anti-fouling film can be removed by a corona treatment or a plasma treatment. It is possible to determine that removal of the anti-fouling film has been finished as long as a contact angle with water on the surface from which the anti-fouling film has been removed is about 20° or less.

The surface arithmetic mean roughness Ra of the antiglare film 3 is 0.01 μm or more. The arithmetic mean roughness Ra is a value obtained by averaging absolute value deviations from a reference plane at a roughness curve contained in a reference length taken on the reference plane. The arithmetic mean roughness Ra is 0.01 μm or more, and thereby the antiglare film 3 exhibits an excellent antiglare property. Further, the arithmetic mean roughness Ra of the antiglare film 3 is preferably 0.1 μm or less. The arithmetic mean roughness Ra being 0.1 μm or less is one of the main causes for preventing the haze from becoming too high and enabling achievement of both an excellent antiglare property and low haze by the antiglare film 3.

The surface roughness curve skewness Rsk of the antiglare film 3 is 1.3 or less. Here, the roughness curve skewness Rsk represents the cubic mean of a height Z (x) in the reference length that is made dimensionless by the cube of a root-mean-square height (Zq), and is an index indicating a deviation from an average line of a concave and convex shape. When the value of the roughness curve skewness Rsk is plus (Rsk >9), the concave and convex shape leans toward the concave side to make convexities tend to be sharp, and when this value is minus (Rsk <0), the concave and convex shape leans toward the convex side to make convexities tend to be blunt. When the convexities of the roughness curve are blunter, the haze decreases rather than the sharper ones.

The surface roughness curve skewness Rsk of the antiglare film 3 being 1.3 or less is one of the main causes for enabling the low haze while maintaining an excellent antiglare property. Besides, visual recognition of cloudiness is suppressed when seeing a black printed portion through the antiglare film-coated substrate 1. The surface roughness curve skewness Rsk of the antiglare film 3 is preferably 1.05 or less in order to further reduce the haze while maintaining an excellent antiglare property.

A surface roughness curve element average length RSm of the antiglare film 3 is preferably 18 μm or less, more preferably 17.8 μm or less, and further preferably 17.5 μm or less. Further, RSm is preferably 10 μm or more, more preferably 11 μm or more, and further preferably 14 μm or more. This is because when the roughness curve element average length RSm is too large, the haze and a glare index value (Sparkle) of the antiglare film-coated substrate 1 are likely to be large, and when it is too small, the antiglare property is likely to decrease.

The arithmetic mean roughness Ra, the roughness curve skewness Rsk, and the roughness curve element average length RSm of the surface of the antiglare film 3 can be adjusted by a composition of the antiglare film forming liquid composition (a solid content concentration, a primary particle diameter and a secondary particle diameter of the scaly particles, each content of respective components, and the like) when forming the antiglare film 3, and conditions of applying the antiglare film forming liquid composition to the transparent substrate 2 (in the case of application by a spray method, for example, a spray pressure of the antiglare film forming liquid composition, a liquid amount, a transparent substrate temperature, the number of times of application, and the like).

The arithmetic mean roughness Ra, the roughness curve skewness Rsk, and the roughness curve element average length RSm of the surface of the antiglare film 3 can be measured in accordance with the method defined in JIS B0601-2001 using a SURFCOM1500SD3-12 manufactured by TOKYO SEIMITSU CO., LTD.

The antiglare film 3 has an average film thickness of 15 to 1500 nm. When the average film thickness of the antiglare film 3 is 15 to 50 nm, it is easy to reduce the haze or lower the glare index value. The case where the average film thickness of the antiglare film 3 is 50 nm or more is preferred because it is possible to add a sufficient antiglare property to the antiglare film-coated substrate 1. The average film thickness of the antiglare film 3 being 1500 nm or less is one of the main causes for achieving the optical characteristics such as an antiglare property index value and haze in favorable ranges. Here, the average film thickness of the antiglare film 3 can be measured in a manner that a cross section of the antiglare film 3 is processed by focused ion-beam milling, followed by observation at 10000-times magnification, for example, by a scanning electron microscope (SEM), to then measure the thickness between an interface between the transparent substrate 2 and the antiglare film 3 and the surface of the antiglare film 3 over a photographing range. The film thickness can be calculated using photographing digital data by the SEM or image-processing software.

The antiglare film 3 may be formed so as to cover the entire main surface of the transparent substrate 2 (or of the main surface, the region to which the antiglare property is added) without any space therebetween, or as long as a later-described favorable antiglare property index value and haze can be obtained, for example, the antiglare film 3, for example, may be formed into an island shape in a form in which a part of the main surface (or the above-described region) of the transparent substrate 2 is exposed without the antiglare film being formed thereon. When the thickness of the antiglare film 3 becomes 300 nm or less, for example, there is sometimes a case that the antiglare film 3 is discontinuously formed on the main surface of the transparent substrate 2 and the transparent substrate 2 is exposed without the antiglare film being formed on a part of the main surface of the transparent substrate 2.

The antiglare film 3 may be formed of first convexities each having a diameter of 1 μm or more and second convexities each having a diameter of less than 1 μm, or may have a structure in which the first convexities overlap with one another, the second convexities overlap with one another, or the first convexities and the second convexities overlap with one another. Such a surface structure can be observed by analyzing data measured by a laser microscope by image-processing software.

The film thickness of the antiglare film 3 can be adjusted by the condition of applying the antiglare film forming liquid composition to the transparent substrate 2 (a liquid amount, the number of times of application of the antiglare film forming liquid composition, or the like in the case of application by a spray method, for example), the composition of the antiglare film forming liquid composition (a solid content concentration, each content of respective components, or the like), or the like.

The content of fluorine in the antiglare film 3, in the case where a glass containing 1.0 mass % of fluorine (F) and having a specific gravity of 2.48 is set as a standard sample, is represented as a value obtained by dividing a measured value of fluorine in the antiglare film 3 by a measured value of fluorine in the standard sample (F content), and the fluorine content is preferably 2.5 or less, more preferably 2.2 or less, and further preferably 1.8% or less. This is to suppress an increase in RSm. The F content is preferably 0.23 or more, more preferably 0.3 or more, and further preferably 0.4 or more. This is for temperature and moisture durability. The above-described F content can be measured by the following method, for example. A ZSX100e manufactured by Rigaku Corporation is used to measure the fluorine content (mass %) in a film to be measured and the fluorine content in the standard sample under conditions of measurement diameter 30 mm, measurement ray F-Kα, filter OUT, slit std., dispersive crystal RX35, detector PC, PHA100-300, peak angle 38.794 deg. (20 sec), and B.G. angle 43.000 deg. (10 sec). The F content is calculated by dividing the measured value of the fluorine content of the film to be measured by the measured value of the fluorine content of the standard sample.

When the later-described anti-fouling film is formed on the surface of the antiglare film 3, the F content in the antiglare film 3 is measured after the anti-fouling film is removed. The anti-fouling film can be removed by a corona treatment or a plasma treatment. Incidentally, it is possible to determine that removal of the anti-fouling film has been finished as long as the contact angle with water on the surface from which the anti-fouling film has been removed is about 20° or less.

The F content in the antiglare film 3 can be adjusted by the composition of the antiglare film forming liquid composition, the content of the $CF_3(CH_2)_n$-group in the antiglare film forming liquid composition, the type of the fluorine-containing silica precursor (A), the content of the $CF_3(CH_2)_n$-group that the fluorine-containing silica precursor (A) has, or the like.

The haze of the antiglare film-coated substrate 1 (Haze) is preferably 8 or less, and more preferably 6.8 or less. When the antiglare film-coated substrate 1 has a black printed portion on a surface opposite to the antiglare film 3 in the case of the haze being 8 or less, visual recognition of cloudiness in the black printed portion is suppressed and the antiglare film-coated substrate 1 having excellent beautiful appearance can be obtained.

As for the surface gloss of the antiglare film-coated substrate 1, 60° specular gloss (%) (Gloss) is preferably 135% or less, more preferably 130% or less, and further preferably 120% or less. The 60° specular gloss (%) (Gloss) is preferably 50% or more, more preferably 60% or more, and further preferably 70% or more. Here, the 60° specular gloss of the antiglare film-coated substrate 1 is a value measured at a flat substantially center portion of the antiglare film 3 after a black felt is applied to the rear surface side to cut off reflection on the rear surface of the antiglare film-coated substrate 1 using an all-in-one gloss meter (manufactured by Rhopoint Instruments, Rhopoint IQ) by the method defined in the 60° specular gloss of JIS Z8741: 1997, for example.

The antiglare property index value (Diffusion) of the surface of the antiglare film-coated substrate 1 is preferably 0.05 or more, more preferably 0.1 or more, and further preferably 0.2 or more. When the antiglare property index value of the surface of the antiglare film-coated substrate 1 is 0.05 or more, an excellent antiglare property is exhibited in the case of the antiglare film-coated substrate 1 being used in an image display device.

The measurement of the antiglare property index value of the surface of the antiglare film-coated substrate 1 can be performed by the following procedures using a GC5000L being a variable angle photometer manufactured by NIPPON DENSHOKU INDUSTRIES CO., LTD. First, a direction parallel to a thickness direction of the antiglare film-coated substrate 1 is set to an angle 0°. At this time, on the main surface side of the antiglare film-coated substrate 1, first light irradiates the main surface of the antiglare film-coated substrate 1 from the direction of angle θ=−45°±0.5° (to be also referred to as the "direction of angle—45°" hereinafter). The first light is reflected on the main surface of the antiglare film-coated substrate 1. Brightness of the 45° reflected light reflected from the main surface of the antiglare film-coated substrate 1 in the direction of angle 45° is measured, to then set as "brightness of 45° reflected light."

Then, while varying the angle θ at which the brightness of light reflected on the main surface of the antiglare film-coated substrate 1 is measured in a range of 5° to 85°, the similar operation is performed, a brightness distribution of the reflected light reflected on the main surface of the antiglare film-coated substrate 1 is measured in the range of 5° to 85° to be added together, and the resultant is set as the "brightness of all reflected lights."

Then, the antiglare property index value (Diffusion) is calculated from the following expression (1).

Antiglare property index value={(brightness of all reflected lights−brightness of 45° reflected light)/(brightness of all reflected lights)}  Expression (1)

The antiglare property index value is correlated with a determination result of the antiglare property made by visual observation of an observer, and is confirmed to exhibit behavior close to a person's visibility. For example, the antiglare film-coated substrate with the antiglare property index value exhibiting a small value (close to 0) is poor in antiglare property, while the antiglare film-coated substrate with the antiglare property index value exhibiting a large value has a good antiglare property.

The glare index value (Sparkle) of the surface of the antiglare film-coated substrate 1 is preferably 90 or less, more preferably 80 or less, and further preferably 70 or less. The glare index value can be measured using an EyeScale ISC-A manufactured by I System Corporation by placing the antiglare film-coated substrate on a display surface of a liquid crystal display so that the antiglare film formed surface (surface having concavities and convexities) faces upward. The larger the glare index value is, the larger the glare is. Incidentally, when the antiglare film-coated substrate 1 is used for a pixel matrix type display element, a large number of light particles having a period larger than that of the pixel matrix are observed on the surface of the antiglare film-coated substrate 1, and the glare means the degree of the light particles to block the visibility, and as the glare is lower, the light particles are not easily observed and the visibility improves.

The haze, the 60° specular gloss, the antiglare property index value, and the glare index value of the antiglare film-coated substrate 1 can be adjusted by the roughness curve skewness Rsk, the arithmetic mean roughness Ra, the roughness curve element average length RSm, and the like of the surface of the antiglare film 3, as described above.

<Antiglare Film Forming Liquid Composition>

The antiglare film 3 can be formed using the antiglare film forming liquid composition. The antiglare film forming liquid composition contains the silica precursor (A) containing the $CF_3(CH_2)_n$-group, the scaly particles (B), and the liquid medium (C). The antiglare film forming liquid composition may contain other components other than the fluorine-containing silica precursor (A), the scaly particles (B), and the liquid medium (C), as long as the characteristics of the antiglare film 3 to be obtained are not impaired. As the other components, there can be cited metal oxide precursors other than silica, (which are titanium, zirconium, and so on, as metal), binders made of a thermoplastic resin, a thermosetting resin, an ultraviolet curable resin, and the like, and so on. Hereinafter, there will be explained respective components to be contained in the antiglare film forming liquid composition.

(Fluorine-Containing Silica Precursor (A))

The fluorine-containing silica precursor (A) forms a matrix containing, as its main component, silica and containing a $CF_3(CH_2)_n$-group (where n is an integer of 1 to 6) by a hydrolysis and condensation reaction.

As the above-described fluorine-containing silica precursor (A) capable of forming the matrix, for example, a fluorine-containing silane compound (A1) having a $CF_3(CH_2)_n$-group and a hydrolyzable group bonded to a silicon atom and its hydrolyzed condensate can be cited, and alkoxysilane and its hydrolyzed condensate (sol gel silica), silazane, and so on may be further contained. The fluorine-containing silane compound (A1) may further have a hydrocarbon group bonded to a silicon atom. One type of the fluorine-containing silica precursor (A) may be used independently, or two or more types of the fluorine-containing silica precursor (A) may be used in combination.

More specifically, the fluorine-containing silica precursor (A) may be made of one or both of the fluorine-containing silane compound (A1) and its hydrolyzed condensate, or may contain one or both of the fluorine-containing silane compound (A1) and its hydrolyzed condensate and one or both of the alkoxysilane and its hydrolyzed condensate. From the viewpoint of preventing cracking and film peeling of the antiglare film 3, the fluorine-containing silica precursor (A) preferably contains one or both of the fluorine-containing silane compound (A1) and its hydrolyzed condensate and one or both of the alkoxysilane and its hydrolyzed condensate.

Examples of the hydrolyzable group bonded to a silicon atom in the fluorine-containing silane compound (A1) include an alkoxy group, an acyloxy group, a ketoxime group, an alkenyloxy group, an amino group, an aminoxy group, an amide group, an isocyanate group, a halogen atom, and so on. Among them, in view of the balance between stability and hydrolyzability of the fluorine-containing silane compound (A1), alkoxy groups such as a methoxy group and an ethoxy group, an isocyanate group, and a halogen atom (a chlorine atom in particular) are preferred. In the case where the fluorine-containing silane compound (A1) has a plurality of hydrolyzable groups, the hydrolyzable groups may be the same groups or different groups, and they are preferably the same groups in view of availability.

When the fluorine-containing silane compound (A1) has a hydrocarbon group bonded to a silicon atom, the hydrocarbon group may be a monovalent hydrocarbon group bonded to one silicon atom, or may be a bivalent hydrocarbon group bonded to two silicon atoms. Examples of the monovalent hydrocarbon group include an alkyl group, an alkenyl group, an aryl group, and so on. Examples of the bivalent hydrocarbon group include an alkylene group, an alkenylene group, an arylene group, and soon. Further, the fluorine-containing silane compound (A1) may have, in place of this hydrocarbon group, a group having one or two or more selected from —O—, —S—, —CO—, and NR'— (where R' is a hydrogen atom or a monovalent hydrocarbon group) interposed between carbon atoms of the hydrocarbon group.

The fluorine-containing silane compound (A1) has a fluorine atom in the $CF_3(CH_2)_n$-group, and thereby a surface tension of the antiglare film forming liquid composition decreases as compared to the case of having no fluorine atom. This makes it possible to reduce the roughness curve skewness Rsk of the antiglare film 3 to be obtained by burning the antiglare film forming liquid composition and reduce the haze of the antiglare film-coated substrate 1.

Further, the $CF_3(CH_2)_n$-group has a fluorine atom, and thus is not easily combusted at the time of heating. Therefore, it is possible to suppress porosification of the antiglare film 3 to be obtained by burning this antiglare film forming liquid composition. Further, the $CF_3(CH_2)_n$-group contains a fluorine atom, thereby making it possible to add excellent chemical resistance and moisture resistance to the antiglare film 3.

In the $CF_3(CH_2)_n$-group that the fluorine-containing silane compound (A1) has, n is an integer of 1 to 6, and is preferably an integer of 1 to 3. The $CF_3(CH_2)_n$-group is particularly preferably a trifluoropropyl group in which n is 2. When the antiglare film forming liquid composition contains two types or more of fluorine-containing silane compounds (A1), n values in the $CF_3(CH_2)_n$-groups may be the same, or different.

As the fluorine-containing silane compound (A1), a compound represented by the following formula (I) is preferred.

$$\{CF_3(CH_2)_n\}_q\text{—Si—}R_{(4-p-q)}L_p \qquad (1)$$

In the formula (I), L is a hydrolyzable group. As the hydrolyzable group, the ones described above can be cited and the preferred groups are also the same. R is a hydrogen atom or a monovalent hydrocarbon group. As the monovalent hydrocarbon group, the ones described above can be cited.

In the formula (I), p and q are numbers satisfying $p+q \leq 4$. p is an integer of 1 to 3. p is preferably 3 or 2 in view of increasing adhesion, and is particularly preferably 3. q is 1 or 2. A decrease in reactivity may be caused when q is plural, and thus 1 is preferred in view of securing the adhesion.

The alkoxysilane is a silane compound having an alkoxy group bonded to a silicon atom. Examples of the alkoxysilane include tetraalkoxysilanes such as tetramethoxysilane, tetraethoxysilane, tetrapropoxysilane, and tetrabutoxysilane.

The fluorine-containing silica precursor (A) may contain other silane compounds capable of forming a matrix within a range not impairing the effect of the present invention, other than one or both of the above-described fluorine-containing silane compound (A1) and its hydrolyzed condensate and one or both of the alkoxysilane and its hydrolyzed condensate.

Examples of the other silane compounds include alkoxysilane having a vinyl group (such as vinyltrimethoxysilane and vinyltriethoxysilane), alkoxysilane having an epoxy group (such as 2-(3,4-epoxycyclohexyl)ethyltrimethoxysilane, 3-glycidoxypropyltrimethoxysilane, 3-glycidoxypropylmethyldiethoxysilane, and 3-glycidoxypropyltriethoxysilane), alkoxysilane having an acryloyloxy group (such as 3-acryloyloxypropyltrimethoxysilane), and so on.

The hydrolysis and condensation reaction of the fluorine-containing silane compound (A1) and the alkoxysilane can be performed by a publicly known method. When tetraalkoxysilane is used as the alkoxysilane, for example, the hydrolysis and condensation reaction is performed by adding water in an amount of 4 times or more by mol of the tetraalkoxysilane and acid or alkali as a catalyst to the tetraalkoxysilane.

Examples of the acid to be used as the catalyst include inorganic acids such as a nitric acid, a sulfuric acid, and a hydrochloric acid and organic acids such as a formic acid, an oxalic acid, a monochloroacetic acid, a dichloroacetic acid, and a trichloroacetic acid. Examples of the alkali to be used as the catalyst include ammonia, sodium hydroxide, potassium hydroxide, and so on. As the catalyst, the acid is preferred in the view of a long-term storage property of the hydrolyzed condensate of the fluorine-containing silane compound (A1).

(Scaly Particles (B))

The scaly particles (B) alone form the antiglare film 3, or form the antiglare film 3 by being contained in a matrix derived from the fluorine-containing silica precursor (A). Incidentally, in addition to ones to be the scaly particles (B) alone, the scaly particles (B) also include ones obtained by appropriately combining particles in other shapes and the like so as to have a shape satisfying an average particle size, a thickness of primary particles, a thickness of secondary particles, an aspect ratio, and the like that are preferred in the scaly particles (B) in this embodiment.

The average particle size of the scaly particles (B) is preferably 0.08 to 0.42 μm, and more preferably 0.17 to 0.21 μm. As long as the average particle size of the scaly particles (B) is 0.08 μm or more, it is possible to sufficiently suppress cracking and film peeling of the antiglare film 3 even though the thickness is thick. As long as the average particle size of the scaly particles (B) is 0.42 μm or less, dispersion stability in the antiglare film forming liquid composition improves.

As the scaly particles (B), there can be cited scaly silica particles, scaly alumina particles, scaly titania particles, scaly zirconia particles, and so on. Among them, the scaly silica particles are preferred from the viewpoint of adding an excellent antiglare property to the antiglare film 3.

The scaly silica particles are made of, for example, flaky silica primary particles and silica secondary particles formed of a plurality of flaky silica primary particles overlaid with their planes oriented in parallel to one another. The silica secondary particle normally has a particle form of a stacked structure. The scaly silica particles may be ones made of only one of the silica primary particles and the silica secondary particles.

The thickness of the silica primary particles is preferably 0.001 to 0.1 μm. A long as the thickness of the silica primary particles is within the aforementioned range, the scaly silica secondary particles in which one or a plurality of the silica primary particles are overlaid with their planes oriented in parallel to one another can be formed. An aspect ratio of the silica primary particles is preferably 2 or more, more preferably 5 or more, and further preferably 10 or more.

The thickness of the silica secondary particles is preferably 0.001 to 1 μm, and more preferably 0.005 to 0.5 μm. An aspect ratio to the thickness of the silica secondary particle is preferably 2 or more, more preferably 5 or more, and further preferably 10 or more. The silica secondary particles are preferably present independently of one another without being fused to one another.

For preparation of the antiglare film forming liquid composition, a powder that is an aggregate of a plurality of scaly silica particles, or a dispersion liquid having the power dispersed in a liquid medium is used. The silica particle concentration in the dispersion liquid is preferably 1 to 80 mass %.

(Liquid Medium (C))

The liquid medium (C) has a function as a solvent to dissolve the fluorine-containing silica precursor (A) or a dispersion medium to disperse the fluorine-containing silica precursor (A), and a function as a dispersion medium to disperse the scaly particles (B). As the liquid medium (C), one type may be used alone, or two or more types may be used in combination.

The liquid medium (C) preferably contains at least a liquid medium (C1) having a boiling point of 160° C. or less and a liquid medium (C2) having a boiling point higher than 160° C.

As long as the boiling point of the liquid medium (C1) is 160° C. or less, the antiglare film 3, which is formed by applying the antiglare film forming liquid composition on the transparent substrate 2 using an electrostatic coating apparatus including an electrostatic coating gun with a rotary atomizing head, followed by burning, has a more excellent antiglare property. The boiling point of the liquid medium (C1) is preferably 50 to 150° C., and more preferably 55 to 140° C. As long as the boiling point of the liquid medium (C1) is equal to or more than the lower limit value of the aforementioned range, after being attached on the transparent substrate 2, liquid drops of the antiglare film forming liquid composition wet and spread on the substrate to easily form a uniform film. As long as the boiling point of the liquid medium (C1) is equal to or less than the upper limit value of the aforementioned range, the concave and convex structure is formed easily.

As the liquid medium (C1), it is possible to use, for example, water, and alcohols (such as methanol, ethanol, isopropyl alcohol, n-butyl alcohol, isobutyl alcohol, and 1-pentanol), ketones (such as acetone, methyl ethyl ketone, and methyl isobutyl ketone), ethers (such as tetrahydrofuran and 1,4-dioxane), cellosolves (such as methyl cellosolve and ethyl cellosolve), esters (such as methyl acetate and ethyl acetate), glycol ethers (such as ethylene glycol monomethyl ether and ethylene glycol monoethyl ether), and so on, which have a boiling point less than 160° C.

When the boiling point of the liquid medium (C2) is higher than 160° C., in the case where the antiglare film forming liquid composition contains the liquid medium (C2), the roughness curve skewness Rsk of the antiglare film 3 is reduced, resulting in that it is easy to achieve both an excellent antiglare property and low haze.

Examples of the liquid medium (C2) include alcohols, ketones, ethers, cellosolves, esters, glycol ethers, nitrogen-containing compounds, sulfur-containing compounds, and so on, which have a boiling point greater than 160° C. Examples of the alcohols include diacetone alcohol, 1-hexanol, ethylene glycol, propylene glycol, and so on. Examples of the nitrogen-containing compound include N,N-dimethylacetamide, N,N-dimethylformamide, N-methylpyrrolidone, and so on. Examples of the glycol ethers include ethylene glycol monobutyl ether, and so on. Examples of the sulfur-containing compound include dimethyl sulfoxide, and so on.

The content ratio of the liquid medium (C1) to the total amount of the liquid medium (C) is preferably 80 to 99.9 mass %, and the content ratio of the liquid medium (C2) is preferably 0.01 to 20 mass %.

Water is required for hydrolyzing the alkoxysilane or the like in the fluorine-containing silica precursor (A). Therefore, the liquid medium (C) preferably contains at least water as the liquid medium (C1). In this case, the liquid medium (C) may contain only water, or may contain one type or more of the liquid medium (C1) other than water and the liquid medium (C2). As the liquid medium (C1) other than water, alcohols are preferred, and methanol, ethanol, isopropyl alcohol, and butanol are particularly preferred. Further, in the case where the liquid medium (C) contains water, as the liquid medium (C2) to be contained in the liquid medium (C), diacetone alcohol and propylene glycol are preferred.

(Composition)

When the antiglare film forming liquid composition contains one or both of the fluorine-containing silane compound (A1) and its hydrolyzed condensate and one or both of the tetraalkoxysilane and its hydrolyzed condensate, with respect to the total amount (100 mass %) of solid content in terms of $SiO_2$ of the fluorine-containing silica precursor (A), the proportion of one or both of the fluorine-containing silane compound (A1) and its hydrolyzed condensate is preferably 3 to 50 mass % (more preferably 5 to 30 mass %) and the proportion of one or both of the tetraalkoxysilane and its hydrolyzed condensate is preferably 50 to 97 mass % (more preferably 70 to 90 mass %). As long as the content of one or both of the fluorine-containing silane compound (A1) and its hydrolyzed condensate is equal to or less than the upper limit value of the aforementioned range, sufficient adhesion strength between the antiglare film 3 and the transparent substrate 2 can be obtained. As long as the content of one or both of the fluorine-containing silane compound (A1) and its hydrolyzed condensate is equal to or more than the lower limit value of the aforementioned range, cracking and film peeling of the antiglare film 3 can be sufficiently suppressed even though the film thickness of the antiglare film 3 is thick.

The content of the scaly particles (B) in the antiglare film forming liquid composition is preferably 3 to 15 mass % and more preferably 5 to 10 mass % with respect to the total amount of solid content (100 mass %) in the antiglare film forming liquid composition. As long as the content of the scaly particles (B) is equal to or more than the lower limit value of the aforementioned range, an excellent antiglare property is exhibited by the antiglare film-coated substrate 1. Further, occurrence of cracking of the film can be prevented. As long as the content of the scaly particles (B) is equal to or less than the upper limit value of the aforementioned range, it is possible to reduce the haze while maintaining an excellent antiglare property.

The content of the liquid medium (C) in the antiglare film forming liquid composition is the amount according to the solid content concentration of the antiglare film forming liquid composition. The solid content concentration of the antiglare film forming liquid composition is preferably 0.1 to 8 mass % and more preferably 0.2 to 1 mass % with respect to the total amount (100 mass %) of the antiglare film forming liquid composition. As long as the solid content concentration is equal to or more than the lower limit value of the aforementioned range, the liquid amount of the antiglare film forming liquid composition can be reduced. As long as the solid content concentration is equal to or less than the upper limit value of the aforementioned range, the film thickness uniformity of the antiglare film improves.

The solid content concentration of the antiglare film forming liquid composition is the total content of the all components other than the liquid medium (C) in the antiglare film forming liquid composition. Incidentally, in this description, the content of the fluorine-containing silica precursor (A) when calculating the solid content concentration of the antiglare film forming liquid composition is calculated in terms of $SiO_2$ unless otherwise noted.

The total content of the fluorine-containing silica precursor (A) and the scaly particles (B) in the antiglare film forming liquid composition is preferably 30 to 100 mass % and more preferably 40 to 100 mass % with respect to the total amount of solid content (100 mass %) of the antiglare film forming liquid composition. As long as the total content of the fluorine-containing silica precursor (A) and the scaly particles (B) is equal to or more than the lower limit value of the aforementioned range, the antiglare film 3 to be obtained is excellent in adhesion with the transparent substrate 2. As long as the total content of the fluorine-containing silica precursor (A) and the scaly particles (B) is equal to or less than the upper limit value of the aforementioned range, cracking and film peeling of the antiglare film 3 are suppressed.

In the case where the fluorine-containing silica precursor (A) contains the hydrolyzed condensate of tetraalkoxysilane, from the viewpoint that the antiglare film 3 having desired performance can be produced with good reproducibility at a high level, it is preferred to mix a solution of tetraalkoxysilane, or a solution of a mixture of tetraalkoxysilane and its hydrolyzed condensate and a dispersion liquid of the scaly particles (B) together and then hydrolyze and condense the tetraalkoxysilane in the presence of the scaly particles (B).

<Method of Producing Antiglare Film-Coated Substrate>

A method of producing an antiglare film-coated substrate in this embodiment is a method of obtaining the antiglare film-coated substrate 1 by applying the antiglare film forming liquid composition explained previously on the transparent substrate 2 by a spray coating method to form an applied film and burning the applied film to form the antiglare film 3. The aforementioned producing method may include a step of forming a functional layer on the surface of the main body of the transparent substrate 2 before forming the antiglare film 3 as necessary. Further, it may include a step of performing other post-processes after forming the antiglare film 3.

(Preparation of Antiglare Film Forming Liquid Composition)

The antiglare film forming liquid composition can be prepared by preparing a solution made by the fluorine-containing silica precursor (A) being dissolved in the liquid medium (C) and mixing a dispersion liquid of the scaly particles (B) and the additional liquid medium (C) as necessary with the solution, for example.

(Applying)

The aforementioned antiglare film forming liquid composition is applied on the transparent substrate 2 by a spray coating method. This is performed by electrically charging the antiglare film forming liquid composition and spraying it onto the transparent substrate 2 by using an electrostatic coating apparatus including an electrostatic coating gun with a rotary atomizing head, for example. Thereby, the applied film of the antiglare film forming liquid composition is formed on the transparent substrate 2. The electrostatic coating apparatus includes a gun main body and a rotary atomizing head and rotatably drives the rotary atomizing head and atomizes the antiglare film forming liquid composition supplied into the rotary atomizing head by centrifugal force, to then discharge and spray it onto the transparent substrate 2.

The distance from a nozzle tip of the electrostatic coating gun (namely, a front end of the rotary atomizing head in a spraying direction of the antiglare film forming liquid composition) to the transparent substrate 2 (to be also referred to as a "gun height" hereinafter) on the occasion of applying the antiglare film forming liquid composition on the transparent substrate 2 is appropriately adjusted according to the width of the transparent substrate 2, the film thickness of the antiglare film forming liquid composition to be applied on the transparent substrate 2, or the like.

The gun height is preferably 150 to 280 mm, more preferably 180 to 240 mm, and further preferably 230 to 240 mm. When the distance to the transparent substrate 2 is too short, the haze of the antiglare film-coated substrate 1 is likely to increase, and when it is too much short, the possibility of causing discharge increases. On the other hand, when the distance to the transparent substrate 2 is too far, in addition to a decrease in coating efficiency, the roughness curve skewness Rsk becomes too high and the antiglare property deteriorates easily.

Further, the size of droplets (size of discharged droplets) of the antiglare film forming liquid composition sprayed from the electrostatic coating apparatus is preferably 12 μm or less and more preferably 10 μm or less in Sauter mean diameter. The Sauter mean diameter is 12 μm or less, and thereby the antiglare film 3 exhibits an excellent antiglare property.

Assuming that the total of surface areas of the droplets and the total of volumes of the droplets are equal, the Sauter mean diameter can be obtained from the ratio of the sum of volumes of measured droplets and the sum of surface areas of measured droplets. The Sauter mean diameter is expressed by the following expression (2) with $x_i$ set to the droplet size and $n_i$ set to the number of droplets with the droplet size $x_i$.

[Mathematical expression 1]

$$\overline{X} = \frac{\sum n_i x_i^3}{\sum n_i x_i^2} \qquad \text{Expression (2)}$$

The Sauter mean diameter can be measured as a value at a position where the maximum Sauter mean diameter is obtained when measuring the Sauter mean diameter while moving a measurement position in a horizontal direction from the center of a cup of the electrostatic coating gun at a 60 mm height from the surface of the transparent substrate.

(Burning)

Then, the applied film of the antiglare film forming liquid composition formed on the transparent substrate 2 is burned. Thereby, the liquid medium (C) in the applied film volatilizes to be removed, and conversion of the fluorine-containing silica precursor (A) remaining in the applied film to a silica-based matrix advances (in the case where the fluorine-containing silica precursor (A) is a silane compound having a hydrolyzable group bonded to a silicon atom, for example, the hydrolyzable group substantially decomposes and condensation of a hydrolysate advances), and at the same time, the film is densified to form the antiglare film 3.

The burning of the applied film may be performed simultaneously with the application by heating the transparent substrate 2 when applying the antiglare film forming liquid composition on the transparent substrate 2, or the applied film may be heated after the antiglare film forming liquid composition is applied on the transparent substrate 2. A burning temperature is preferably 30° C. or more, and in the case of the transparent substrate 2 being glass, for example, it is more preferably 100 to 750° C., and further preferably 150 to 550° C.

The surface temperature of the transparent substrate 2 when applying the antiglare film forming liquid composition is preferably 60° C. or less, preferably 15 to 50° C., and more preferably 20 to 40° C. As long as the surface temperature of the transparent substrate 2 is equal to or more than the lower limit value of the aforementioned range, desired concavities and convexities are formed easily because the liquid medium (C) contained in the antiglare film forming liquid composition evaporates quickly. As long as the surface temperature of the transparent substrate 2 is equal to or less than the upper limit value of the aforementioned range, the adhesion between the transparent substrate 2 and the antiglare film 3 improves. Incidentally, the temperature (application temperature) of the antiglare film forming liquid composition to be sprayed from the electrostatic coating gun is also the same as above.

According to the production method of the embodiment explained above, the antiglare film forming liquid composition is sprayed by using the electrostatic coating apparatus including the rotary atomizing head preferably, thereby making it possible to form the antiglare film 3 having an excellent antiglare property. This is conceivably because as compared to the case where a widely used conventional spray method (for example, a method using a two-fluid nozzle) other than the electrostatic coating apparatus is applied, the droplets of the antiglare film forming liquid composition are attached on the transparent substrate 2 at a slow speed and further the liquid medium (C) in the attached droplets volatilizes rapidly, and thereby the droplets do not easily spread on the transparent substrate 2 and the film is formed in a state where the shape of the droplets when being attached is kept sufficiently.

Further, in the production method in the embodiment explained above, it is possible to control the surface shape of the antiglare film 3 to be formed by the viscosity, application condition, burning temperature, or the like of the antiglare film forming liquid composition.

Second Embodiment

Figure 2:
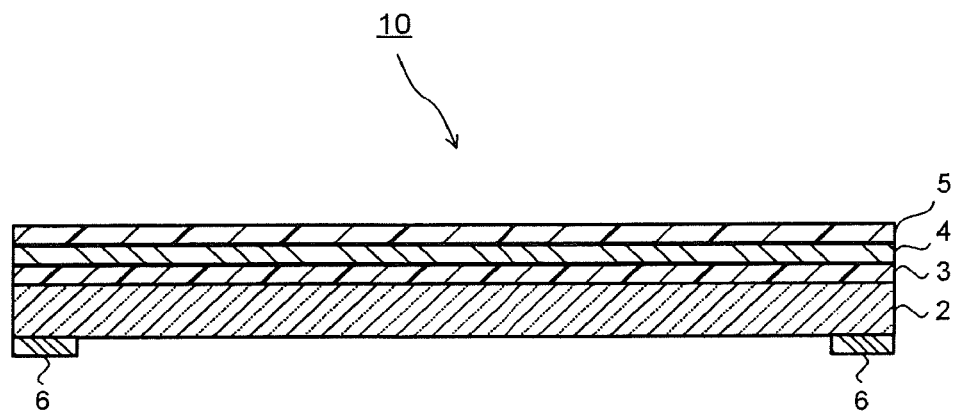
FIG. 2 is a schematic cross-sectional view illustrating an antiglare film-coated substrate according to a second embodiment.
Figure 3:
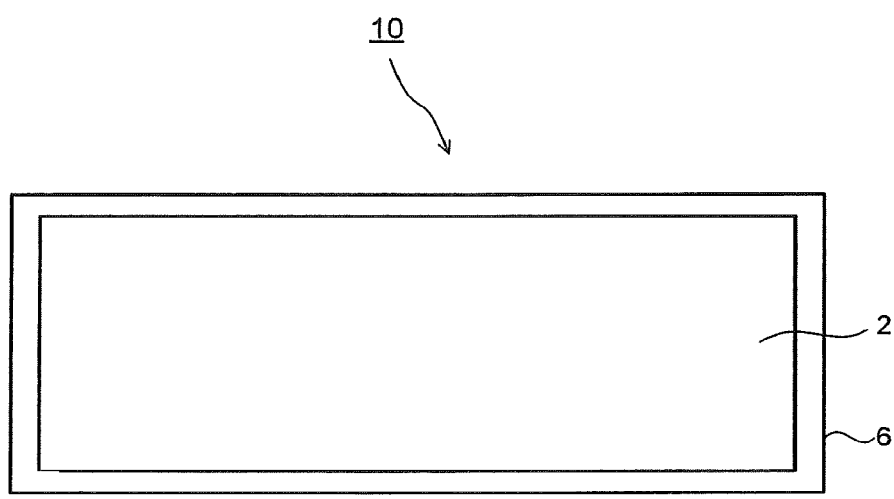
FIG. 3 is a schematic bottom view of the antiglare film-coated substrate in FIG. 2.

FIG. 2 is a schematic cross-sectional view illustrating an antiglare film-coated substrate 10 in this embodiment. FIG. 3 is a schematic bottom view illustrating the antiglare film-coated substrate 10. The antiglare film-coated substrate 10 illustrated in FIG. 2 and FIG. 3 is different from the antiglare film-coated substrate 1 in that a low-reflection film 4 and an anti-fouling film 5 are provided on the antiglare film 3 of the antiglare film-coated substrate 1 illustrated in FIG. 1 and a printed layer 6 is provided at a peripheral edge portion on a surface opposite to the antiglare film 3 of the antiglare film-coated substrate 1, but is common to the antiglare film-coated substrate 1 in terms of the other components. Therefore, in the antiglare film-coated substrate 10, the same symbols are added to the components corresponding to the antiglare film-coated substrate 1 and their detailed explanations are omitted. Incidentally, the low-reflection film 4, the anti-fouling film 5, and the printed layer 6 all do not have to be provided, and one type or two types of them may be provided.

(Low-Reflection Film)

The low-reflection film 4 is a film that is provided on the antiglare film 3 and suppresses reflection itself of light incident on the transparent substrate 2 to blur a reflected image. A composition of the low-reflection film 4 can be set to a composition in which a high-refractive index layer having a refractive index at a wavelength of 550 nm of 1.9 or more and a low-refractive index layer having a refractive index at a wavelength of 550 nm of 1.6 or less are stacked, for example. The low-reflection film 4 is not limited as long as it has a composition capable of suppressing the reflection of light.

In the case where the low-reflection film 4 has a composition in which a high-refractive index layer and a low-refractive index layer are stacked, the low-reflection film may have a form containing one high-refractive index layer and one low-refractive index layer each, but may have a composition containing two or more of each of them. In the case where two or more high-refractive index layers and two or more low-refractive index layers are contained, a form is preferred in which the high-refractive index layer and the low-refractive index layer are stacked alternately.

Materials of the high-refractive index layer and the low-refractive index layer are not limited in particular, and can be appropriately selected considering the degree of required low reflectivity, productivity, and so on. As the material composing the high-refractive index layer, it is possible to preferably use one type or more selected from, for example, a niobium oxide ($Nb_2O_5$), a titanium oxide ($TiO_2$), a zirconium oxide ($ZrO_2$), a tantalum oxide ($Ta_2O_5$), and a silicon nitride ($Si_3N_4$). As the material composing the low-refractive index layer, it is possible to preferably use one type or more selected from a silicon oxide ($SiO_2$), a material containing a mixed oxide of Si and Sn, a material containing a mixed oxide of Si and Zr, and a material containing a mixed oxide of Si and Al.

The low-reflection film 4 preferably has a composition containing the high-refractive index layer being a layer made of one type selected from a niobium oxide, a tantalum oxide, and a silicon nitride and the low-refractive index layer being a layer made of a silicon oxide from viewpoints of the productivity and the refractive index.

A method of forming each layer composing the low-reflection film 4 is not particularly limited, and for example, a vacuum deposition method, an ion beam assisted deposition method, an ion plating method, a sputtering method, a plasma CVD method, or the like can be used. Among these film-forming methods, the sputtering method is preferred because using the sputtering method makes it possible to form a dense film with high durability. In particular, sputtering methods such as a pulse sputtering method, an AC sputtering method, and a digital sputtering method are preferred.

When the film-forming is performed by the pulse sputtering method, for example, the transparent substrate 2 is disposed in a chamber in a mixed gas atmosphere of inert gas and oxygen gas, and then targets are selected so as to have a desired composition as a low reflection film forming material to form a film. At this time, the gas type of the inert gas in the chamber is not particularly limited, and various inert gases such as argon and helium can be used. When the high-refractive index layer and the low-refractive index layer are formed by the pulse sputtering method, it is possible to adjust a layer thickness of each layer by adjusting discharge power, a film-forming time, and the like, for example.

In the antiglare film-coated substrate 10 in this embodiment, in the case where the antiglare film 3 contains silica as its main component and the low-reflection film 4 composed of the high-refractive index layer and the low-refractive index layer is formed on the antiglare film 3, it is possible to achieve low reflectivity in addition to a high antiglare property and a low haze ratio.

(Stain-Proof Film)

The anti-fouling film 5 is provided on the low-reflection film 4. The anti-fouling film 5 is a film that suppresses adhesion of organic matters or inorganic matters to the surface, or a film that brings about an effect capable of easily removing extraneous matters by cleaning such as wiping out even when organic matters or inorganic matters adhere to the surface.

The anti-fouling film 5 is not limited as long as it has water repellency and oil repellency, for example, and can add an antifouling property to the antiglare film-coated substrate 10 to be obtained, but is preferably formed of a fluorine-containing organosilicon compound film obtained by curing a fluorine-containing organosilicon compound by a hydrolysis and condensation reaction.

Further, the thickness of the anti-fouling film 5 is preferably 2 to 30 nm and more preferably 5 to 20 nm in the case where the anti-fouling film 5 is formed of the fluorine-containing organosilicon compound film, for example. As long as the film thickness of the anti-fouling film 5 is 2 nm or more, the antiglare film-coated substrate 10 becomes excellent in scratch resistance of the strain-proof film 5 as well as in antifouling property. Further, as long as the film thickness of the anti-fouling film 5 is 30 nm or less, optical characteristics such as the antiglare property and the haze of the antiglare film-coated substrate 10 in a state of the anti-fouling film 5 being formed thereon are good.

As a method of forming the fluorine-containing organosilicon compound film, there can be cited a method in which a composition of a silane coupling agent having a fluoroalkyl group such as a perfluoroalkyl group; a fluoroalkyl group containing a perfluoro(polyoxyalkylene) chain is applied on the surface of the low-reflection film 4 by a spin coating method, a dip coating method, a casting method, a slit coating method, a spray coating method, or the like, to then be heat treated as necessary, a vacuum deposition method in which the fluorine-containing organosilicon compound is vapor deposited on the surface of the low-reflection film 4, to then be heat treated as necessary, and so on. The vacuum deposition method is preferred in order to obtain a high adhesive fluorine-containing organosilicon compound film. The formation of the fluorine-containing organosilicon compound film by the vacuum deposition method is preferably performed using a film forming composition containing a fluorine-containing hydrolyzable silicon compound.

The film forming composition is a composition containing the fluorine-containing hydrolyzable silicon compound, and is not limited as long as it is the composition that enables film formation by the vacuum deposition method. The hydrolyzable silicon compound may contain a partially hydrolyzed condensate and a partially hydrolyzed co-condensate in addition to the compound itself.

As the fluorine-containing hydrolyzable silicon compound used for the formation of the fluorine-containing organosilicon compound film in this embodiment, concretely, there can be cited a fluorine-containing hydrolyzable silicon compound having one or more groups selected from the group consisting of a perfluoropolyether group, a perfluoroalkylene group, and a perfluoroalkyl group. These groups exist as a fluorine-containing organic group that is bonded to a silicon atom of a hydrolyzable silyl group through a linking group or directly.

The film forming composition containing such a fluorine-containing hydrolyzable silicon compound is attached to the surface of the low-reflection film 4 to be subjected to reaction, and thereby a fluorine-containing organosilicon compound film can be obtained. Incidentally, conventionally publicly known methods, conditions, and so on are applicable as the concrete vacuum deposition method and reaction conditions.

At this time, the anti-fouling film 5 may be formed directly on the surface of the antiglare film 3 without the low-reflection film 4 being formed thereon. In this case, as described previously, the antiglare film 3 contains the CF$_3$(CH$_2$)$_n$-group thereinside, thereby suppressing the porosification, resulting in that a phenomenon in which the film forming composition permeates porous substances does not occur. Therefore, the anti-fouling film 5 having an excellent adhesion property with the antiglare film 3 and an excellent antiglare property can be obtained.

The anti-fouling film 5 can be formed by applying the film forming composition using a publicly known spraying apparatus, or the like, for example. The film forming composition is applied to the antiglare film-coated substrate 1 while moving a nozzle of the spraying apparatus in parallel in a first direction from one end portion toward the other end portion. The nozzle that has arrived at the other end portion is moved in parallel in a second direction vertical to the first direction by a predetermined interval (to be referred to as a pitch, hereinafter). The nozzle is moved in parallel again toward the one end portion from the other end portion. While performing this repeatedly, the film forming composition is applied so that an applied region becomes the entire surface of the antiglare film-coated substrate 1.

In the case of the small pitch, the number of times of the nozzle to reciprocate above the antiglare film-coated substrate 1 is larger as compared to the case of the large pitch, so that it is possible to think that by accelerating a moving speed of the nozzle, a discharge amount per unit area can be made constant. Table 1 illustrates the moving speed of the nozzle and a measurement result of the content of F atoms on the substrate according to the pitch.

TABLE 1

| Nozzle moving speed (mm/sec) | Pitch (mm) | F content |
|---|---|---|
| 500 | 8 | 1.17 |
| 400 | 10 | 1.13 |
| 333 | 12 | 1.13 |
| 286 | 14 | 0.97 |

The result of Table 1 reveals that coating efficiency of the film forming composition is good when the moving speed of the nozzle is accelerated and the pitch is reduced rather than the case where the moving speed of the nozzle is slowed and the pitch is increased even when the discharge amount per unit area is made constant. Particularly, the pitch being set to 12 mm or less is preferred because thereby the coating efficiency of the film forming composition improves. The result of Table 1 is obtained by measuring the content of F atoms after application of the film forming composition to a glass plate on which the antiglare film is not formed, but the same tendency is seen also in the antiglare film-coated substrate 1.

(Printed Layer)

The printed layer 6 is provided as necessary so as to conceal wiring circuits disposed in the vicinity of an outer periphery of an image display device of a portable device or the like and conceal an adhesive part between a casing of the portable device and the antiglare film-coated substrate 10, and so on, for example, for the purpose of increasing display visibility and beautiful appearance. Here, a peripheral edge portion means a strip-shaped region along an outer periphery of the antiglare film-coated substrate 10, having a predetermined width from the outer periphery toward a center portion. The printed layer 6 may be provided at the entire peripheral edge of the surface on the side opposite to the main surface of the transparent substrate 2, or may be provided at a part of the peripheral edge.

The printed layer 6 is formed with a width capable of concealing, for example, the aforementioned wiring circuits and adhesive part in a desired color according to each purpose. The printed layer 6 is formed using ink, for example.

Examples of the ink include an inorganic ink containing a ceramic fired body or the like and an organic ink containing a color material such as dye or pigment and an organic resin. When the printed layer 6 is formed in black, for example, as the ceramic contained in a black inorganic ink, there can be cited oxides such as a chromium oxide and an iron oxide, carbides such as a chromium carbide and a tungsten carbide, carbon black, mica, and so on. The black printed layer 6 is obtained in a manner that an ink made of the aforementioned ceramic and silica is melted to be printed in a desired pattern, and then is dried. This inorganic ink requires melting and drying processes, and is used as a glass dedicated ink in general.

The organic ink is a composition containing a desired color dye or pigment and an organic resin. Examples of the organic resin include an epoxy-based resin, an acrylic-based resin, polyethylene terephthalate, polyethersulfone, polyarylate, polycarbonate, an acrylonitrile-butadiene-styrene (ABS) resin, a phenol resin, a transparent ABS resin, homopolymers such as polyurethane, polymethylmethacrylate, polyvinyl, polyvinylbutyral, polyetheretherketone, polyethylene, polyester, polypropylene, polyamide, and polyimide, and a resin made of a copolymer of a monomer copolymerizable with a monomer of these resins.

Between the aforementioned inorganic ink and organic ink, use of the organic ink is preferred because its drying temperature is low. Besides, the organic ink containing pigment is preferred from a viewpoint of chemical resistance.

The printed layer 6 is formed by the aforementioned ink being printed in a predetermined region of the surface opposite to the main surface of the transparent substrate 2. As a printing method, there are a bar coating method, a reverse coating method, a gravure coating method, a die coating method, a roll coating method, a screen printing method, an ink-jet method, and so on, but the screen printing method is preferred because printing can be performed easily and further printing on various base materials is enabled in desired sizes. The printed layer 6 may be composed of multiple layers made of a stack of a plurality of layers, or may be composed of a single layer. When the printed layer 6 is composed of multiple layers, the printed layer 6 can be formed by performing printing of the aforementioned ink and drying repeatedly.

When the antiglare film-coated substrate 10 having the printed layer 6 provided thereon is used as a front plate of an image display device, or the like, the antiglare film-coated substrate 10 is provided on the visible side (front) of the image display device so that the printed layer side is disposed on the image display device side. When visually recognizing the image display device having the antiglare film-coated substrate 10 provided thereon from the front, through the antiglare film 3 and the transparent substrate 2, the black printed portion is visually recognized at the peripheral edge portion and a display portion is visually recognized on the inner of the peripheral edge portion.

In the case where the haze of the front plate is high at this time, the black printed portion is seen cloudily, and in the case where the display portion becomes black in a state of not being electrically conducted to a display panel, boundaries are created between the black printed portion and the black display portion seen through the front plate to impair the beautiful appearance in some times. In the antiglare film-coated substrate 10 in this embodiment, the haze is reduced, and thus the boundaries are not easily created between the black printed portion and the black display portion seen through the front plate and the black printed portion and the display portion are visually recognized continuously without these boundaries to exhibit excellent beautiful appearance.

<Application of Antiglare Film-Coated Substrate>

Applications of the antiglare film-coated substrate of the present invention are, for example, vehicle transparent parts (such as a headlight cover, a side mirror, a front transparent substrate, a side transparent substrate, a rear transparent substrate, and an instrument panel surface), meters, building windows, show windows, displays (such as a notebook PC, a monitor, an LCD, a PDP, an ELD, a CRT, and a PDA), LCD color filters, substrates for touch panel, pickup lenses, optical lenses, spectacle lenses, camera parts, video parts, CCD cover substrates, optical fiber end faces, projector parts, copier parts, solar cell transparent substrates (such as a cover glass), mobile phone windows, backlight unit parts (such as a light guide plate and a cold cathode tube), backlight unit part liquid crystal brightness-improving films (such as a prism and a semi-transmissive film), liquid crystal brightness-improving films, organic EL light emitting device parts, inorganic EL light emitting device parts, phosphor light emitting device parts, optical filters, end faces of optical parts, illumination lamps, illumination device covers, amplified laser light sources, antireflection films, polarizing films, agricultural films, and so on.

As the application of the antiglare film-coated substrate of the present invention, with a view of enabling achievement of both an excellent antiglare property and low haze at high levels, interior articles of transport vehicles are preferred, and on-vehicle articles are more preferred. As the on-vehicle article, on-vehicle systems provided with an image display device (a car navigation system, an instrument panel, a headup display, a dashboard, a center console, and a shift knob) are preferred.

[Example]

Hereinafter, the present invention will be explained in detail with reference to examples, but is not limited to the following examples. Among Examples 1 to 28, Examples 1 to 17 are practical examples, and Examples 18 to 28 are comparative examples.

Evaluations methods and materials used in the respective examples are described below.

<Optical Characteristic Evaluation Method>

(Roughness Curve Skewness Rsk, Arithmetic Mean Roughness Rs, Roughness Curve Element Average Length RSm)

The roughness curve skewness Rsk, the arithmetic mean roughness Rs, and the roughness curve element average length RSm of the surface of the antiglare film were each measured in accordance with the method defined in JIS B0601-2001 using a SURFCOM1500SD3-12 manufactured by TOKYO SEIMITSU CO., LTD.

(Average Film Thickness)

The film thickness of the antiglare film was measured as follows. A cross section of the antiglare film processed by focused ion-beam milling was observed at 10000 to 100000-times magnification by a SEM, to then measure the thickness between an interface between the glass and the antiglare film and the surface of the antiglare film over a whole photographing range. The film thickness over the whole photographing range can be calculated from the number of pixels in a direction vertical to a scale bar and the film thickness out of the number of pixels counted on the whole cross section of the antiglare film on digital data. Further, it may be calculated using commercially available image-processing software. As for the SEM observation, a visual field of 70 μm or more was observed in a direction vertical to the film thickness and an average value was set to the average film thickness.

(F Content)

The F content in the antiglare film was measured by the following method. A glass containing 1.0 mass % of fluorine (F) and having a specific gravity of 2.48 was set as a standard sample. A ZSX100e manufactured by Rigaku Corporation was used to measure the fluorine content (mass %) in a film to be measured and the fluorine content (mass %) in the standard sample under conditions of measurement diameter 30 mm, measurement ray F-Kα, filter OUT, slit std., dispersive crystal RX35, detector PC, PHA100-300, peak angle 38.794 deg. (20 sec), and B.G. angle 43.000 deg. (10 sec). The F content was calculated by dividing the measured value of the fluorine content in the film to be measured by the measured value of the fluorine content in the standard sample, which were measured above.

(Haze)

The haze (%) of the antiglare film-coated substrate was measured in accordance with the method defined in JIS K7136: 2000 using a haze meter (HR-type 100 manufactured by MURAKAMI COLOR RESEARCH LABORATORY).

(60° Specular Gloss (Gloss))

As the specular gloss of the surface of the antiglare film-coated substrate, 60° specular gloss (%) was measured. The 60° specular gloss was measured on a substantially center portion of the antiglare film by the method defined in the 60° specular gloss of JIS 28741: 1997, using an all-in-one gloss meter (manufactured by Rhopoint Instruments, Rhopoint IQ) after a black felt was applied to the rear surface side (surface side on the side opposite to the main surface) to cut off reflection on the rear surface of the antiglare film-coated substrate.

(Antiglare Property Index Value (Diffusion))

The measurement of the antiglare property index value of the antiglare film-coated substrate was performed by the following procedures using a GC5000L being a variable angle photometer manufactured by NIPPON DENSHOKU INDUSTRIES CO., LID.

The direction parallel to the thickness direction of the antiglare film-coated substrate was set to 0°. At this time, on the main surface side of the antiglare film-coated substrate, first light irradiates the main surface of the antiglare film-coated substrate from the direction of angle $\theta=-45°\pm0.5°$ (to be also referred to as the "direction of angle—45°" hereinafter). The first light is reflected on the main surface of the antiglare film-coated substrate. Brightness of the 45° reflected light reflected from the main surface of the antiglare film-coated substrate in the direction of angle 45° was measured, to then set as "brightness of 45° reflected light."

Then, while varying the angle $\theta$ at which the brightness of light reflected on the main surface of the antiglare film-coated substrate 1 is measured in a range of 5° to 85°, the similar operation is performed, a brightness distribution of the reflected light reflected on the main surface of the antiglare film-coated substrate 1 is measured in the range of 5° to 85° to be added together, and the resultant is set as the "brightness of all reflected lights."

Then, the antiglare property index value (Diffusion) is calculated from the aforementioned expression (1).

(Glare Index Value (Sparkle) Measurement)

The glare index value was measured using an EyeScale ISC-A manufactured by I System Corporation by placing the antiglare film-coated substrate on a display surface of a liquid crystal display (i-Phone 4 manufactured by Apple Inc., pixel per inch 326 ppi) so that the antiglare film formed main surface (surface having concavities and convexities) faces upward.

(Temperature Durability)

The durability of the antiglare film was set in such a manner that in a heat shock test (in which a process in which the condition of −40° C. for 30 minutes and the condition of 90° C. for 30 minutes are repeated alternately is performed for 500 cycles), the change in haze before and after the test being 0.5% or more is set to "failure" and the change in haze before and after the test being less than 0.5% is set to "good."

(Gun Height)

The distance between the lowermost end of the center portion of an electrostatic coating gun (later-described electrostatic automatic gun) to spray the antiglare film forming liquid composition and the surface of the transparent substrate was described as the gun height.

<Material>

(Silica Precursor)

As the silica precursor (A), tetraethoxysilane and organosilane were used.

As the organosilane, one type of trifluoropropyltrimethoxysilane, bis trimethoxysilyl ethane, propyltrimethoxysilane, hexyltrimethoxysilane, and octyltriethoxysilane (each manufactured by Shin-Etsu Silicone) was used.

(Scaly Particle Dispersion Liquid)

As the scaly particle dispersion liquid, a SLV liquid (manufactured by AGC Si-Tech Co., Ltd., a scaly silica particle dispersion liquid made by disintegrating SUNLOVELY LFS HN150 to be dispersed in water) was used. The average particle size of the scaly silica particles in the SLV liquid was 175 nm, the average aspect ratio (average particle size/average thickness) was 80, and the scaly silica particle concentration was 5 mass %.

(Liquid Medium)

As the liquid medium, one made by mixing diacetone alcohol or propylene glycol in SOLMIX (registered trademark) AP-11 (manufactured by Japan Alcohol Trading Co., Ltd.) was used. The SOLMIX AP-11 is a mixed solvent of 85 mass % of ethanol, 10 mass % of isopropyl alcohol, and 5 mass % of methanol.

(Example 1)

Tetraethoxysilane, as the organosilane, trifluoropropyltrimethoxysilane, and the SLV liquid were prepared so that the solid content concentration in terms of $SiO_2$ of the fluorine-containing silica precursor (tetraethoxysilane, organosilane, SLV particles) became 3.11 mass % and the content of each component with respect to the total amount of solid content became the proportion in Table 2. At this time, the aforementioned liquid medium was used, and while stirring the liquid medium using a magnetic stirrer, the tetraethoxysilane, the organosilane, and the SLV liquid were added to the liquid medium being stirred to be mixed at 25° C. for 30 minutes. Thereafter, with respect to the amount of a mixed solution of the aforementioned tetraethoxysilane, trifluoropropyltrimethoxysilane, SLV liquid, liquid medium, 0.54 mass % of a nitric acid aqueous solution having a concentration of 60 mass % was dropped onto the mixed solution, and further the resultant mixed solution was mixed at 60° C. for 60 minutes, to then obtain a precursor of an antiglare film forming liquid composition.

The precursor liquid obtained as above was diluted with AP-11 so as to have the solid content concentration in Table 2, to thereby obtain the antiglare film forming liquid composition.

As the transparent substrate, there was used a glass substrate obtained by chemically tempering a special glass for chemical tempering Dragontrail (registered trademark) (size: 100 mm×100 mm, thickness: 1.1 mm) manufactured by Asahi Glass Co., Ltd. at 410° C. for 2.5 hours by using a $KNO_3$ molten salt. The chemically tempered glass substrate had a compressive stress layer depth of 25 μm and a surface compressive stress of 750 MPa.

The surface of the aforementioned chemically tempered glass substrate (transparent substrate) was washed with a neutral detergent and then washed with pure water to be dried.

The antiglare film forming liquid composition obtained as above was applied on the washed and dried transparent substrate by an electrostatic coating apparatus (liquid electrostatic coater manufactured by Asahi Sunac Corporation) to form an applied film. As the electrostatic coating gun of the electrostatic coating apparatus, a rotary atomizing electrostatic automatic coating gun (manufactured by Asahi Sunac Corporation, Sun Bell, ESA120, cup diameter: 70 mm) was used.

The temperature in a coating booth of the electrostatic coating apparatus was adjusted to fall within a range of 25±3 C.° and the humidity was adjusted to fall within a range of 50%±10%. On a chain conveyor of the electrostatic coating apparatus, the washed transparent substrate that was heated to 30 C.°±3 C.° beforehand was placed via a stainless plate. While carrying the transparent substrate at a constant speed of 3.0 m/minute by the chain conveyor, the antiglare film forming liquid composition at a temperature within a range of 25±3 C.° was applied to the top surface (surface on the side opposite to the surface that was in contact with molten tin at the time of production by a float method) of the glass substrate by an electrostatic coating method at the gun height illustrated in Table 2 for two times, followed by burning at 450 C.° for 30 minutes in the atmosphere to then form an antiglare film, and an antiglare film-coated substrate was obtained. The obtained antiglare film-coated substrate was evaluated as above. Results are illustrated in Table 3.

(Examples 2 to 28)

An antiglare film forming liquid composition in each of Examples was obtained by the same operation as in Example 1 except that preparation was performed so that the type and the content of the organosilane, the contents of the tetraethoxysilane and the SLV liquid, and the content of each component with respect to the total amount of solid content became the type and the proportions in Table 2. The obtained antiglare film forming liquid composition was used to produce an antiglare film-coated substrate in the same manner as in Example 1 at the gun height in Table 2, and the obtained antiglare film-coated substrate was evaluated as above. Results are illustrated in Table 3. In Example 16 only, the number of applications of the antiglare film forming liquid composition was set to one time.

Further, the size of droplets (size of discharged droplets) of the antiglare film forming liquid composition discharged from the rotary atomizing electrostatic automatic coating gun of the aforementioned electrostatic coating apparatus was measured using an image analysis type particle size distribution measurement system VisiSize 6 manufactured by Japan Laser Corporation. Measurements conditions of the size of discharged droplets are as follows.

(Measurement Condition)

Spray type: Rotary atomizing electrostatic automatic coating gun

Gun height: 235 mm from the substrate surface to the cup end

Measurement position: Position at the height of 60 mm from the glass substrate surface, where the incoming frequency of droplets of the antiglare film forming liquid composition becomes maximum when performing the measurement while moving a measurement position in a horizontal direction from the position directly below the cup center of the rotary atomizing electrostatic automatic coating gun Measured droplet number: 1000 droplets Average droplet size calculation: Sauter mean diameter based on droplet sizes of the measured 1000 droplets was calculated Measurement region at each measurement position:
2623 μm (height)×1475 μm (width)×1795 μm (depth)

(Measurement Result)

In each of Examples of the gun height being 235 mm out of Examples 1 to 28, the Sauter mean diameter was 10.7 μm±1 μm at the position at the height of 60 mm from the substrate surface, where the Sauter mean diameter becomes maximum when performing the measurement while moving a measurement position in a horizontal direction from the cup center of the gun.

TABLE 2

| | Solid content concentration | Content with respect to solid content 100 mass % | | | | Gun height |
| | | Scaly silica particle | Tetraethoxysilane | Organosilane | | |
| Example | [Mass %] | [Mass %] | [Mass %] | [Mass %] | Type | [mm] |
| --- | --- | --- | --- | --- | --- | --- |
| 1 | 0.5 | 10 | 85 | 5 | Trifluoropropyltrimethoxysilane | 235 |
| 2 | 0.5 | 10 | 82.5 | 7.5 | Trifluoropropyltrimethoxysilane | 235 |
| 3 | 0.5 | 10 | 80 | 10 | Trifluoropropyltrimethoxysilane | 235 |
| 4 | 0.5 | 10 | 77.5 | 12.5 | Trifluoropropyltrimethoxysilane | 235 |
| 5 | 0.5 | 10 | 75 | 15 | Trifluoropropyltrimethoxysilane | 235 |
| 6 | 0.5 | 10 | 72.5 | 17.5 | Trifluoropropyltrimethoxysilane | 235 |
| 7 | 0.5 | 10 | 70 | 20 | Trifluoropropyltrimethoxysilane | 235 |
| 8 | 0.5 | 10 | 67.5 | 22.5 | Trifluoropropyltrimethoxysilane | 235 |
| 9 | 0.5 | 10 | 65 | 25 | Trifluoropropyltrimethoxysilane | 235 |
| 10 | 0.215 | 5 | 88.2 | 6.8 | Trifluoropropyltrimethoxysilane | 235 |
| 11 | 0.215 | 5 | 86 | 9 | Trifluoropropyltrimethoxysilane | 235 |
| 12 | 0.215 | 5 | 84 | 11 | Trifluoropropyltrimethoxysilane | 235 |
| 13 | 0.215 | 5 | 82 | 13 | Trifluoropropyltrimethoxysilane | 235 |
| 14 | 0.215 | 5 | 80 | 15 | Trifluoropropyltrimethoxysilane | 235 |
| 15 | 0.215 | 5 | 78 | 17 | Trifluoropropyltrimethoxysilane | 235 |
| 16 | 0.215 | 5 | 88.2 | 6.8 | Trifluoropropyltrimethoxysilane | 235 |
| 17 | 0.5 | 10 | 77.5 | 12.5 | Trifluoropropyltrimethoxysilane | 185 |
| 18 | 0.5 | 10 | 87.5 | 2.5 | Trifluoropropyltrimethoxysilane | 235 |
| 19 | 0.5 | 10 | 77.5 | 12.5 | Trifluoropropyltrimethoxysilane | 285 |
| 20 | 0.5 | 10 | 77.5 | 12.5 | Trifluoropropyltrimethoxysilane | 335 |
| 21 | 0.5 | 15 | 72.5 | 12.5 | Bis trimethoxysilyl ethane | 235 |
| 22 | 0.5 | 10 | 77.5 | 12.5 | Bis trimethoxysilyl ethane | 235 |
| 23 | 0.5 | 5 | 82.5 | 12.5 | Bis trimethoxysilyl ethane | 235 |
| 24 | 0.5 | 10 | 77.5 | 12.5 | Propyltrimethoxysilane | 235 |
| 25 | 0.5 | 10 | 73 | 17 | Propyltrimethoxysilane | 235 |
| 26 | 0.5 | 10 | 70 | 20 | Propyltrimethoxysilane | 235 |

TABLE 2-continued

| | Solid content concentration | Content with respect to solid content 100 mass % | | | | Gun height |
|---|---|---|---|---|---|---|
| | | Scaly silica particle | Tetraethoxysilane | Organosilane | | |
| Example | [Mass %] | [Mass %] | [Mass %] | [Mass %] | Type | [mm] |
| 27 | 0.5 | 10 | 77.5 | 12.5 | Hexyltrimethoxysilane | 235 |
| 28 | 0.5 | 10 | 77.5 | 12.5 | Octyltriethoxysilane | 235 |

TABLE 3

| Example | Ra (μm) | Rsk | RSm (μm) | Haze (%) | Gloss (%) | Diffusion | Sparkle | Average film thickness (nm) | F Content | Temperature durability |
|---|---|---|---|---|---|---|---|---|---|---|
| 1 | 0.062 | 1.23 | 17.2 | 7.5 | 83 | 0.23 | 53 | 390 | 0.41 | Good |
| 2 | 0.063 | 1.20 | 17.2 | 7.4 | 82 | 0.23 | 56 | 390 | 0.62 | Good |
| 3 | 0.064 | 1.07 | 17.2 | 7.2 | 80 | 0.26 | 57 | 400 | 0.86 | Good |
| 4 | 0.063 | 1.02 | 17.2 | 6.8 | 79 | 0.27 | 58 | 400 | 1.04 | Good |
| 5 | 0.063 | 0.95 | 18.0 | 6.6 | 80 | 0.26 | 61 | 400 | 1.26 | Good |
| 6 | 0.058 | 0.80 | 17.2 | 5.4 | 86 | 0.27 | 64 | 410 | 1.45 | Good |
| 7 | 0.061 | 0.79 | 18.4 | 5.4 | 85 | 0.28 | 80 | 410 | 1.66 | Good |
| 8 | 0.061 | 0.74 | 19.6 | 5.1 | 86 | 0.29 | 78 | 410 | 1.87 | Good |
| 9 | 0.063 | 0.70 | 20.2 | 4.9 | 85 | 0.30 | 89 | 420 | 2.09 | Good |
| 10 | 0.033 | 1.02 | 14.1 | 2.7 | 109 | 0.10 | 30 | 170 | 0.25 | Good |
| 11 | 0.033 | 0.88 | 14.2 | 2.5 | 111 | 0.09 | 31 | 170 | 0.31 | Good |
| 12 | 0.032 | 0.85 | 14.6 | 2.3 | 111 | 0.09 | 32 | 170 | 0.42 | Good |
| 13 | 0.035 | 0.84 | 14.8 | 2.6 | 108 | 0.12 | 36 | 180 | 0.49 | Good |
| 14 | 0.035 | 0.84 | 14.7 | 2.3 | 110 | 0.11 | 31 | 180 | 0.55 | Good |
| 15 | 0.031 | 0.72 | 15.7 | 2.1 | 108 | 0.11 | 35 | 180 | 0.60 | Good |
| 16 | 0.013 | 0.33 | 14.7 | 0.5 | 128 | 0.06 | 26 | 90 | 0.13 | Good |
| 17 | 0.048 | 0.54 | 17.5 | 3.5 | 103 | 0.24 | 61 | 430 | 1.18 | Good |
| 18 | 0.064 | 1.36 | 17.5 | 8.1 | 84 | 0.22 | 58 | 390 | 0.21 | Failure |
| 19 | 0.071 | 1.39 | 17.3 | 8.4 | 81 | 0.23 | 55 | 380 | 0.92 | Good |
| 20 | 0.071 | 1.53 | 17.1 | 10.0 | 75 | 0.23 | 53 | 360 | 0.80 | Good |
| 21 | 0.073 | 2.53 | 15.5 | 16.2 | 75 | 0.22 | 53 | 400 | 0 | Failure |
| 22 | 0.077 | 1.90 | 15.3 | 13.2 | 70 | 0.23 | 53 | 400 | 0 | Failure |
| 23 | 0.063 | 1.84 | 18.2 | 11.9 | 70 | 0.21 | 54 | 400 | 0 | Failure |
| 24 | 0.066 | 1.51 | 15.3 | 10.6 | 75 | 0.26 | 50 | 400 | 0 | Failure |
| 25 | 0.076 | 1.54 | 15.9 | 11.4 | 67 | 0.27 | 47 | 410 | 0 | Failure |
| 26 | 0.077 | 1.53 | 15.2 | 12.9 | 59 | 0.27 | 49 | 410 | 0 | Failure |
| 27 | 0.084 | 1.36 | 16.0 | 12.6 | 58 | 0.35 | 56 | 410 | 0 | Failure |
| 28 | 0.094 | 1.41 | 18.0 | 13.7 | 53 | 0.34 | 64 | 410 | 0 | Failure |

Tables 2, 3 reveal that in the antiglare film-coated substrate in the practical example (Examples 1 to 17), the antiglare property index value is 0.05 or more and the haze being 8 or less is obtained, thus enabling achievement of both an excellent antiglare property and low haze. In the antiglare film-coated substrate in the comparative example (Examples 18 to 28), the antiglare property index value became a good result, but the haze increased and the visibility deteriorated. This is conceivably because Rsk was greater than 1.3. Therefore, according to the present invention, it was found out that the antiglare film-coated substrate that has achieved both an excellent antiglare property and low haze can be obtained.

<Grease Wiping Performance Evaluation Test>

The grease wiping performance evaluation test was performed as follows. On an antiglare film of a clean antiglare film-coated substrate, 0.05 g of NIVEA Creme manufactured by Kao Corporation was applied as grease. Then, a silicone plug having a φ 15 mm bottom surface with a 1 kg load put thereon was placed on the cream, to thereby transfer the grease onto the silicone plug. Subsequently, the silicone plug with the 1 kg load put thereon, onto which the grease had been transferred, was placed on a paper waste for 80 seconds to remove the redundant grease. Subsequently, the silicone plug with the 1 kg load put thereon was placed on a sample surface, to then transfer the grease onto the sample surface, and then an evaluation sample was prepared.

The number of wipes required until the grease on the evaluation sample was transferred onto a wiper cloth cut into a strip shape (manufactured by Toray Industries, Inc., 20 mm was put, and the grease became invisible was counted. The portion of the wiper cloth that had touched the grease was not reused, and wiping was performed so that a clean portion of the wiper cloth always could touch the grease. When the grease was wiped off within 20 times, the wiping performance was good and set as "good", and when it was within 10 times, the wiping performance was excellent and set as "excellent." The case where 21 times or more were required for wiping off was set as "failure," and results of the test are illustrated in Table 4.

A calico No. 3 (cotton standard adjacent fabrics in conformity with JIS L 0803 of Japanese Standards Association) was attached to an indenter having a bottom area of 20 mm×20 mm, and in a state of a 1 kg load being applied, the indenter was frictionally slid on a surface of an abrasion resistance sample for 100,000 times in a reciprocating manner at a frictional sliding speed of 80 reciprocations per minute and for a frictional sliding distance of 40 mm. The surface of the sample after the frictional sliding having no change at all visually was very good in abrasion resistance and thus evaluated as "excellent," and the surface of the sample having three or less flaws each having a width of 0.8 mm or less was good in abrasion resistance and thus evaluated as "good." The case of the flaw having a width of 0.8 mm or more being recognized, or the case of four or more flaws each having a width of 0.8 mm or less being recognized was poor in abrasion resistance and thus evaluated as "failure," and results of the test are illustrated in Table 4.

TABLE 4

| Example | Grease wiping performance | Abrasion resistance |
| --- | --- | --- |
| 1 | Good | Good |
| 2 | Good | Good |
| 3 | Good | Good |
| 4 | Excellent | Excellent |
| 5 | Excellent | Excellent |
| 6 | Excellent | Excellent |
| 7 | Excellent | Excellent |
| 8 | Excellent | Excellent |
| 9 | Excellent | Excellent |
| 10 | Excellent | Excellent |
| 11 | Excellent | Excellent |
| 12 | Excellent | Excellent |
| 13 | Excellent | Excellent |
| 14 | Excellent | Excellent |
| 15 | Excellent | Excellent |
| 16 | Excellent | Excellent |
| 17 | Excellent | Excellent |
| 18 | Failure | Failure |
| 19 | Failure | Failure |
| 20 | Failure | Failure |
| 21 | Failure | Failure |
| 22 | Failure | Failure |
| 23 | Failure | Failure |
| 24 | Failure | Failure |
| 25 | Failure | Failure |
| 26 | Failure | Failure |
| 27 | Failure | Failure |
| 28 | Failure | Failure |

Table 4 reveals that in the antiglare film-coated substrate in the practical example (Examples 1 to 17), the grease wiping performance and the abrasion resistance were good. This is conceivably because Rsk is related, and in the case of Rsk being too large, convexities of the concavities and convexities derived from the antiglare film become sharp, thus making it difficult to remove the grease, and further points of the convexities are broken easily, and thus the abrasion resistance decreases. In the antiglare film-coated substrate of the present invention, Rsk was set to 1.3 or less, thereby making it possible to obtain not only good optical characteristics, but also good results in terms of the grease wiping performance relating to ease of wiping off fingerprints and the abrasion resistance relating to abrasiveness. Furthermore, it reveals that Rsk was set to less than 1.07, thereby making it possible to obtain better grease wiping performance and abrasion resistance.

What is claimed is:

1. An antiglare film-coated substrate, comprising:
a transparent substrate; and
an antiglare film provided on the transparent substrate,
wherein the antiglare film comprises silica as its main component and a $CF_3(CH_2)_n$-group where n is an integer of 1 to 6,
wherein the antiglare film has surface roughness curve skewness Rsk of 1.3 or less and has arithmetic mean roughness Ra of 0.01 μm or more,
wherein the antiglare-film-coated substrate has a 60° specular gloss of from 82% to 128%,
wherein the antiglare film has a surface roughness curve element average length RSm of 10 μm to 20.2 μm, and
wherein a value obtained by dividing a measured value of a fluorine content of the antiglare film by a measured value of the fluorine of a standard sample (F content) is 0.23 to 2.5, where the standard sample is a glass containing 1.0 mass % of fluorine and having a specific gravity of 2.48.

2. The antiglare film-coated substrate according to claim 1, wherein the antiglare film has an average film thickness of 15 to 1500 nm.

3. The antiglare film-coated substrate according to claim 2, wherein the antiglare film has the average film thickness of 50 to 1500 nm.

4. The antiglare film-coated substrate according to claim 1, wherein a part of the surface of the transparent substrate is exposed without the antiglare film formed thereon.

5. The antiglare film-coated substrate according to claim 1, wherein the antiglare film has a surface roughness curve element average length RSm of 10 μm to 18 μm.

6. The antiglare film-coated substrate according to claim 1, wherein the antiglare film has the surface roughness curve skewness Rsk of 1.05 or less.

7. The antiglare film-coated substrate according to claim 1, wherein the antiglare film has the surface arithmetic mean roughness Ra of 0.1 μm or less.

8. The antiglare film-coated substrate according to claim 1, wherein the $CF_3(CH_2)_n$-group is a $CF_3CH_2CH_2$-group.

9. The antiglare film-coated substrate according to claim 1, wherein the antiglare film has 60° specular gloss of the surface of 135% or less.

10. The antiglare film-coated substrate according to claim 1, wherein the transparent substrate is made of a glass substrate.

11. The antiglare film-coated substrate according to claim 1, wherein the transparent substrate is made of a chemically tempered glass substrate.

12. The antiglare film-coated substrate according to claim 1, wherein the transparent substrate has a curved surface.

13. The antiglare film-coated substrate according to claim 1, wherein the transparent substrate has a thickness of 0.1 to 5 mm.

14. A method of producing an antiglare film-coated substrate according to claim 1, comprising:
applying an antiglare film forming liquid composition containing trifluoropropyltrimethoxysilane, scaly silica particles and liquid medium on a transparent substrate by a spray coating method to form an applied film, and
burning the applied film to obtain an antiglare film-coated substrate,
wherein the antiglare film comprises silica as its main component and a $CF_3(CH_2)_n$-group where n is an integer of 1 to 6, and
wherein the antiglare film has surface roughness curve skewness Rsk of 1.3 or less and has arithmetic mean roughness Ra of 0.01 μm or more.

15. The method of producing the antiglare film-coated substrate according to claim 14, wherein the antiglare film forming liquid composition is applied on the transparent substrate by an electrostatic spray coating method.

* * * * *